US005597960A

United States Patent [19]
Beaudoim

[11] Patent Number: 5,597,960
[45] Date of Patent: Jan. 28, 1997

[54] PUMP STATION FLOWMETER

[76] Inventor: Benott Beaudoim, P.O. Box 580, 132 Corporate Blvd., Indian Trail, N.C. 28079

[21] Appl. No.: 461,264

[22] Filed: Jun. 5, 1995

[51] Int. Cl.$^6$ ....................................................... G01F 3/38
[52] U.S. Cl. ................................................. 73/861; 73/223
[58] Field of Search ............................. 73/861, 195, 223, 73/198

[56]                 References Cited

U.S. PATENT DOCUMENTS

| | | | |
|---|---|---|---|
| 3,565,286 | 2/1971 | Latham, Jr. | 222/4 |
| 4,127,030 | 11/1978 | Martig, Jr. | 73/861 |
| 4,467,657 | 8/1984 | Olsson | 73/861 |
| 4,669,308 | 6/1987 | Jorritsma | 73/223 |
| 4,856,343 | 8/1989 | Hon | 73/861 |
| 4,962,666 | 10/1990 | Adney et al. | 73/223 |
| 5,313,842 | 5/1994 | Marsh et al. | 73/861 |
| 5,385,056 | 1/1995 | Marsh et al. | 73/861 |
| 5,467,650 | 11/1995 | Cushing | 73/861 |

FOREIGN PATENT DOCUMENTS 6288808A  4/1993  Japan ..................................... 73/861

OTHER PUBLICATIONS

BHF Research Ltd, "Pumping Station Monitoring System" Aug. 1989.

*Primary Examiner*—Richard Chilcot
*Assistant Examiner*—Max H. Noori
*Attorney, Agent, or Firm*—Allen, Dyer, Doppelt, Franjola & Milbrath, P.A.

[57]                 ABSTRACT

A pump station flowmeter is disclosed including a pump status comparator for creating level status without being connected to any level sensors by comparing pump status to a list of association between expected pump status and levels. The wet well dimension, pump status signals, clock signals, level status are recorded in memory before being used as input to a flow calculator which calculates inflow and outflow. A flow rectifier readjusts the inflow and outflow according to a variable proportion of the difference between an average of many outflows and one outflow, and using this difference to readjust a variable tolerance and the variable proportion. This optimizes accuracy according to each specific installation. Abnormal pump operations are confirmed when a predetermined number of possible abnormal pump operations occur in a row are detected by comparing the outflow to the average of many outflows plus or minus the variable tolerance. A maintenance status is declared when an outflow calculated is physically impossible so the inflow calculated is the time of operation of the pumps divided by the time of the maintenance status. Alarms are generated when the outflow or the inflow is over or under predetermined values. Outflow can be replaced by a coefficient if the wet well dimension is unknown so the flowmeter can still be used to generate alarms.

16 Claims, 6 Drawing Sheets

Pump Station

Pump Station Normal Operation

Average formula 4 cycles formula

Difference between Average formula and 4 Cycles formula

Average formula 4 cycles formula

Difference between Average formula and 4 Cycles formula

PUMP STATION FLOWMETER

BACKGROUND

1. Field of Invention

A pump station flowmeter is disclosed which includes a volumetric flowmeter for determining an accurate measurement of the flow of liquid through a liquid system like a sewage system, a pump status converter for eliminating the usual heavy modification of the control panel required by the installation of volumetric flowmeters, a flow rectifier to calculate flow with maximum accuracy according to each specific installation, an abnormal pump operation processor to differentiate pump flow error calculation from real abnormal pump operation, and a pump flow variation alarm gate for generating alarms when abnormal pump flow is calculated based only on pump-on and pump-off inputs.

2. Description of Prior Art

Most Prior Art is related to volumetric flowmeters specially designed for pump stations. They require level inputs to work. None calculates flow without being connected to level sensors, none individually optimizes its calculus for each specific installation, and none is able to generate pump flow variation alarms without any inputs other than pump-on and pump-off.

Pump station flowmeters, or the like, are well known in the patented prior art, such as the U.S. Pat. Nos.: Martig, Jr. 4,127,030, Jorritsma 4,455,870, 4,669,308 and 4,821,580; Olsson 4,467,657, Free et al. 4,897,797, Hon 4,856,343, Adney 4,962,666, and Marsh et al. 5,313,842 and 5,385,056

(a) All the instruments using these patents must be physically connected to level sensors and/or pressure devices in order to be used. This makes the installation of these instruments laborious and expensive.

Pump stations are composed of a wet well which accepts liquid inflow and temporarily stores such inflow, and a pump, or combination of pumps, which discharge the accumulated liquid from the wet well. The rate of change of level in the wet well with respect to time (dl/dt) is a function of the shape and size of the wet well, the flow entering the wet well is the inflow, and the flow leaving the wet well is the outflow.

The shape and size of the wet well are usually known, and therefore if dl/dt is measured, it can be converted to the rate of change of volume with respect to time (dV/dt). The rate of change of volume depends on the inflow and outflow.

While the pump (or pumps) is off, the inflow can be measured by timing how long it takes for the liquid to fill a known volume. This is done by using existing upper and lower limit switches which are already present to turn the pumps on and off. This method provides an average inflow ($\overline{Inflow}$) over the time that it takes to fill the known wet well volume.

If the $\overline{Inflow}$ is also known during the pump on time, the total volume passed through the wet well in one wet well pump cycle can be calculated by the equation: $\overline{Outflow}=Vp/tp+\overline{Inflow}$. $\overline{Outflow}$ is the average outflow of the pump in operation for that cycle, Vp is the volume of the wet well between the pump on and pump-off switches, and tp is the length of time the pumps were on. It is important to note that the inflow is a function of time and is not a constant. If an $\overline{Inflow}$ for the pump-on time is known, then a numerical version of equation $\overline{Outflow}=Vp/tp+\overline{Inflow}$ would be used:

$$Volume/cycle=Vp+\overline{Inflow} \times tp.$$

(b) Unfortunately, timing the wet well as it fills will give an $\overline{Inflow}$ which is not an accurate estimate of inflow during the pump on time if the inflow significantly increases or decreases between the pump off time and pump on time. One way to reduce this error is to add another level switch at an intermediate level to define another, smaller volume. The fill time of this intermediate volume can be used to measure an $\overline{Inflow}$ over a shorter period of time which is closer to the onset of the pump-on time, and, hence, is a better estimate of the $\overline{Inflow}$ during the pump on time.

Variations on this idea include measuring the $\overline{Inflow}$ before and after the pump on time and calculating their average which is $\overline{Inflow}$, or adding more intermediate level switches to measure several $\overline{Inflows}$ and then performing a best fit of the $\overline{Inflow}$ versus time for interpolation and averaging. Although these techniques improve the system's performance, a sudden flow change will still lead to large errors, and the installation process becomes impractical.

(c) Inflow changing at a high frequency can cause large errors in the flow calculus. High frequency inflows are flows which change a significant amount over a short period of time, making it difficult for a system which samples the flow periodically to obtain an accurate estimate of the inflow during the pump-on time. High frequency flows are likely to occur at pump stations downstream of another pump station or at industrial pump stations. Small domestic pump stations may have high frequency phenomena as well.

A method disclosed in the Jorritsma U.S. Pat. No. 4,455,870 samples the inflow once per pump cycle, and a second method samples the inflow twice per pump cycle, and therefore, it was thought to be twice as accurate as the first method. Adding more intermediate switches allows a system to measure the volume through the wet well accurately at even higher inflow frequencies. However, it is not practical to measure high frequency inflows in this manner because too many switches are required, and the errors related to the sensors themselves add-up.

(d) One important phenomenon of periodic flow entering a pump station can be termed "lock-on". Lock-on occurs when the pump-on time and the inflow synchronize and remain that way which means the liquid is going in at about the same speed it is going out. Lock-on maximizes the errors in flow measurement systems which use fill times to estimate the inflow during the pump on time. The occurrence of lock on is affected by the size of the wet well, the inflow frequency, the inflow magnitude, and the pump characteristics. It occurs very easily over a relatively wide range of frequencies. Such frequency conditions often exist downstream of another pump station or at relatively small pump stations.

Once a pump station is locked on, it will remain so until the inflow frequency changes enough to disturb it. The tendency of the pump-on time and the maximum inflow to remain locked in phase can be explained as follows. At low inflows, the pump is less likely to come on because the level is less likely to reach the top level switch. Conversely, the pump is more likely to come on when the inflow is high. This tendency forces the pump to turn on during the increasing part of the inflow cycle. The pump-on time lengthens because of the increasing inflow. Ultimately, the pump-on time straddles and then passes the inflow peak. Once the pump on time occurs during the period of decreasing inflow, the pump flow is large enough to empty the wet well before the inflow reaches its minimum. At this point, the two cycles are locked in phase and the pump-on time will not advance across the inflow minimum. Under these conditions, inflow estimates based on prior fill time data will be highly inaccurate.

(e) These problems are partially overcome by using a different approach. If the outflow of the pump (or pumps) and the time of operation of the pumps are known, the volume passing through the wet well in one pump cycle can be calculated by: Volume per cycle =pump outflow×time of operation. The filling time of the well being known, the Inflow of a cycle can be calculated by: Inflow=volume per cycle/(time of operation+filling time).

In most cases, wet well pumps discharge into an open channel pipe which carries the liquid downstream by gravity: the pumps simply lift the water a constant distance from the pump outlet to the elevation of the open channel pipe. The pump outlet is under a constant pressure due to the column of water between the pump outlet and the beginning of the open channel flow line where the liquid discharges to a gravity feed line. The pressure on the inlet side of the pump is directly related to the level of the liquid in the wet well. The liquid level changes from the pump stop level to the start level to the stop level at each cycle. Each level being reached at each cycle, we can conclude that a constant average pressure generates a constant average pump outflow. If the inflow is accurately calculated, the outflow calculated will be fairly constant. If the calculated outflow is not constant, we can assume two possibilities: the inflow was not properly calculated or the pump outflow had really changed.

Marsh U.S. Pat. No. 5,385,056 assume only the first possibility by comparing the last calculated $\overline{\text{Outflow}}$ of a pump to the average of all the $\overline{\text{Outflow}}$ for that pump which is $\overline{\overline{\text{Outflow}}}$. If the $\overline{\text{Outflow}}$ is within a specified range of $\overline{\overline{\text{Outflow}}}$, then $\overline{\overline{\text{Outflow}}}$ is updated with $\overline{\text{Outflow}}$. If the $\overline{\text{Outflow}}$ calculated is outside the specified range, then $\overline{\overline{\text{Outflow}}}$is used instead of the last $\overline{\text{Outflow}}$. The possibility that an outflow can change drastically, like when a pump is damaged or blocked was not considered. It is more accurate to say that the exact $\overline{\text{Outflow is}}$ somewhere between the last calculated $\overline{\text{Outflow}}$ and $\overline{\overline{\text{Outflow}}}$.

Furthermore, they assume that by adding intermediate levels, they would gain accuracy. Level sensors operating in pump stations wetwell are rarely highly accurate due to turbulent liquid surface, grease build-up, solids, etc. Adding levels means less distance between levels. Reducing the distance between levels by two is like doubling the resulting sensor related error. For example, let's say a station using float switches has an accuracy of ½ inch each. Two sensors are necessary to calculate a volume. If 20 inches separates the 2 switches, then the error is 5% (½×2/20"). If an intermediate switch is installed 8 inches from the top switch, the error becomes 12.5% (½×2/8").

(f) Each pump station being different with its own filling and emptying characteristics, a specific range, common to all stations can not generate the most accurate values for all stations. The station's characteristics change over time, ruling out the possibility of using a specific range even within a station as specified in Marsh U.S. Pat. No. 5,385,056.

(g) The stability of the outflow calculated for each pump, which is calculated using the inflow, is a proof of the accuracy of the inflow. Two reasons can create rapid outflow changes that could let us believe the inflow causes the errors in the calculation. One is natural, meaning inhuman factors cause it, and one is human, meaning the level sensors or the pumps are manually activated because the pump station is in a period of maintenance. Usually in a period of maintenance, the wet well is cleaned using high pressure water. This makes the level detector, specially if floats are used, send false signals to the control panel which starts and stops the pumps at any level at any time. This induces errors in the volumetric flowmeter which understands that the start and stop levels were reached in a matter of seconds generating gigantic inflow and outflow. The maintenance people might turn the pump off or on to determine if they are working properly, which gives the impression that the starting or stopping levels were reached. None of the above patents have any way to detect that a pump station is in a maintenance period.

(h) All the above volumetric methods calculate flow using functions that assume a constant $\overline{\text{Inflow}}$ or average outflow. The real inflow entering the pump station is always changing. This fact invalidates the uses of a constant inflow calculation as an acceptable representation of reality.

(i) Most of the instruments using the above volumetric methods generate alarms based on low or high pump outflow which indicate a pump problem. To do this, the minimum information supplied by the user to the instrument is the geometry of the well, and the instrument must be connected to the level sensors. They can not generate abnormal pump flow alarms without them. It is not practical for a pump manufacturer to integrate in its pumps an outflow alarm system without knowing if the end user will be able to provide the wet well geometry and the level sensors.

(j) No Prior Art shows how to calculate inflow and outflow when a pump is continuously running and when more than one pump is running.

(k) This device can be used in any installation that has a mechanism that changes its state at set levels. This apparatus can facilitate the installation of instruments that need to know the level to operate. Volumetric flowmeters are good examples of these instruments. This apparatus reduces installation time of such instrument from hours to minutes by reducing or eliminating the necessary modification of the control panel of the pump station.

The present invention was developed to avoid the above and other drawbacks of the prior systems.

OBJECTS AND ADVANTAGES

Accordingly, several objects and advantages of my invention are:

(a) to provide a pump station flowmeter that can be installed without being connected to any level sensor, reducing the cost of installation;

(b) to provide a pump station flowmeter that reduces the pump on time inflow and outflow errors without the use of additional or existing level sensors;

(c) to provide a pump station flowmeter that accurately calculates flows, even when inflow changes rapidly without the use of additional or existing level sensors;

(d) to provide a pump station flowmeter that calculates accurately when the "lock-on" phenomenon occurs;

(e) to provide a pump station flowmeter that discerns outflow calculation errors from abnormal pump operation;

(f) to provide a pump station flowmeter that continuously self adjusts its parameters to optimize the accuracy for each individual station;

(g) To provide a flowmeter which can identify when a pump station is in maintenance period.

(h) to provide a pump station flowmeter that calculates inflow using a function representing the time changing reality;

(i) to provide a pump station flowmeter that can generate abnormal pump flow alarms, even without supplying the wet well geometry or being connected to the level sensors;

(j) to provide a pump station flowmeter that calculates inflow and outflow when a pump is continuously running and when more than one pump is running.

(k) to provide to other instruments the level data they need without being connected to any level sensor.

Further objects and advantages of my invention will become apparent from a consideration of the drawings and ensuing description.

DRAWING FIGURES

Figure 1:
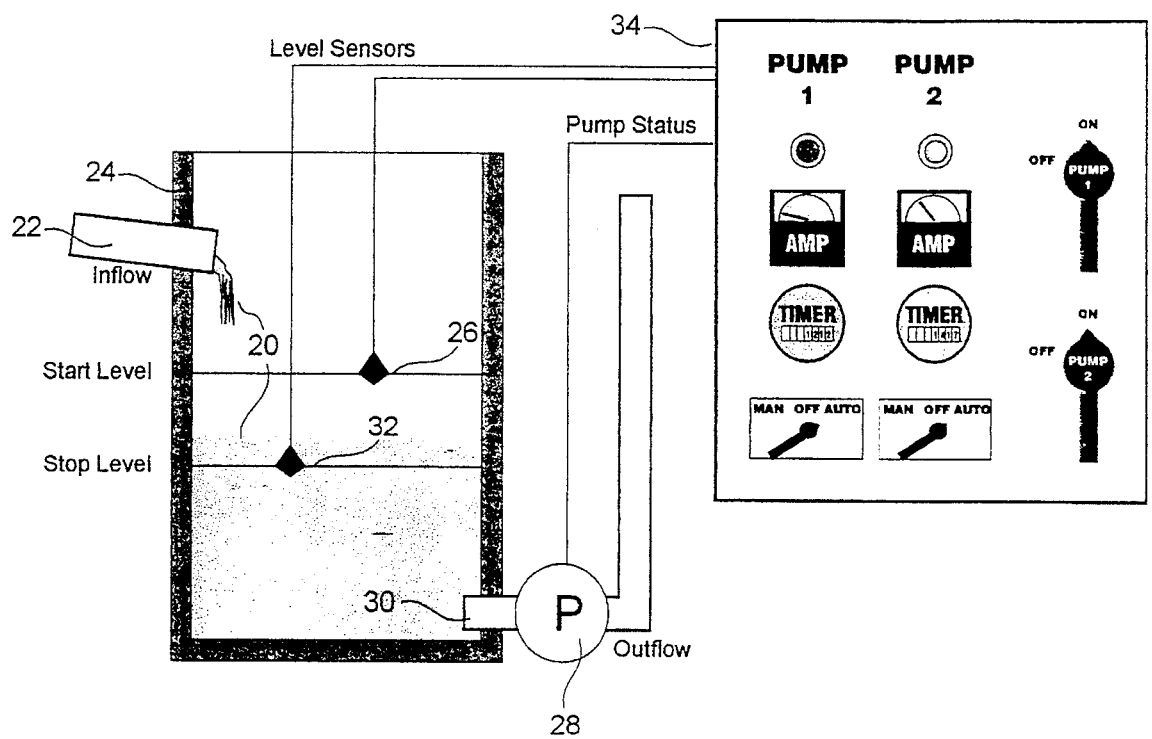
FIG. 1 is a diagrammatic representation of a wet well pumping system.

Reference Numerals In Drawings
20 Liquid in wet well
22 Inflow source of liquid
24 Wet well
26 Start level
28 Pump status
30 Outlet of liquid
32 Stop level
34 Control panel
36 Pump cycle
38 Liquid level
40 Volume between levels
42 $\overline{\text{Inflow}}$ over pump OFF period
44 $\overline{\text{Inflow}}$ from average formula
46 Inflow curve from Inflow(t) formula
48 $\overline{\text{Inflow}}$ from Inflow(t)formula
50 Operating configuration
52 Pump status converter
54 Clock
56 Raw data memory
58 Flow calculator
60 Data storage memory
62 Flow rectifier
64 Under counter
66 Over counter
68 Reset counter means
70 Maintenance gate
72 Abnormal event gate
74 Inflow alarm gate
78 Outflow alarm gate
80 Operation sequence memory
82 Association sequence
84 Association sequence comparator
86 Level memory
88 Level gate
90 Delay calculator
92 Sequence analyzer
94 Pump status list
96 External flowmeter

DESCRIPTION OF INVENTION

FIG. 1 illustrates by a diagram a wet well pumping system, commonly called a pump station, in which a liquid 20 from inflow source 22 fills a wet well 24 until a level sensor 26 starts a pump or combination of pumps 28 to pump out the liquid through an outlet 30 until a level sensor 32 stops the pump or combination of pumps. Throughout the following text, a pump equals one or more pumps. The source 22 fills the wet well 24 at a variable filling rate, or inflow. A pumping rate, or outflow, is usually constant for a pump, but not always, so it can not be assumed to be a constant value. An electric control panel 34 receives a signal from a level sensor system (26 & 32) when the start and stop levels are reached, then starts or stops the pump 28 according to an operating configuration specifying an operating sequence related to the pump operation when different levels are reached.

The level sensor system can be a float switch system, an ultrasonic system, a pressure system, a resistive system, a capacitive system or any other type of system supplying a level signal to the control panel 34 when specific levels are reached. A control panel 34 is usually designed to control two or more pumps and supply the user with information such as pump status, current, cumulative operation time, level of the liquid, etc. The operating sequence can be altered by human factors, like a user manually starting or stopping the pumps, and abnormal factors, like a defective pump.

Figure 2:
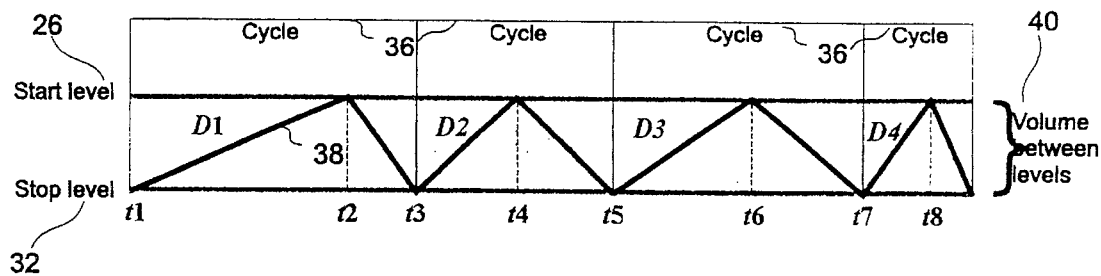
FIG. 2 is a schematic of the basic operation of a wet well pumping system in reference to time.

FIG. 2 illustrates the basic operation of the pump station described in FIG. 1 in relation to time. A pump cycle 36 is a repetition of the steps describe in FIG. 1. A pump cycle 36 begins when the pump stops when stop level 32 is reached. A liquid level 38 rises from the stop level 32 to a start level 26. A volume of liquid 40 between the start level 26 and the stop level 32 is known. The volume between levels 40 is constant and used in the following equations to calculate an inflow. A fill up time between pump operation D1 is calculated by subtracting t2 from t1. An average inflow D1 for the period t1 to t2 is calculated by:

$$D1 = \frac{\text{Volume}}{t2 - t1}.$$

The same applies to period $$D2 = \frac{\text{Volume}}{t4 - t3}, D3 = \frac{\text{Volume}}{t6 - t5} \text{ and } D4 = \frac{\text{Volume}}{t8 - t7}.$$

This is true only if no pump runs while D1, D2, D3 or D4 are calculated. But sometimes, pump stations operate in a condition where a pump p is almost always running and a second pump operates from a higher level. In this case, the outflow generated by the pump p is added to the value of the inflow. The pump p is usually running between lower levels at which an average outflow of p ($\overline{\text{Outflow}(p)}$) was calculated when the pump was stopping from time to time. The average level at which the $\overline{\text{Outflow}(p)}$ is calculated directly influences its value: The higher the level, the higher the value. When a pump is almost always running, the average level of operation between the starts and stops of the second pump is higher, meaning the $\overline{\text{Outflow}}$ of the pump that is always running is higher. A coefficient Kp adjusts the value of $\overline{\text{Outflow}(p)}$ according to the difference of performance of the pump p due to an operation at a different average level. To calculate $\overline{\text{Inflows}}$ for D1, D2, D3 or D4 while a pump p is running, the following equations 1, 2, 3 and 4 apply:

$$D1 = \frac{\text{Volume}}{t2 - t1} + \overline{\text{Outflow}(p)} \times Kp, \quad (1)$$

$$D2 = \frac{\text{Volume}}{t4 - t3} + \overline{\text{Outflow}(p)} \times Kp, \quad (2)$$

$$D3 = \frac{\text{Volume}}{t6 - t5} + \overline{\text{Outflow}(p)} \times Kp \text{ and} \quad (3)$$

$$D4 = \frac{\text{Volume}}{t8 - t7} + \overline{\text{Outflow}(p)} \times Kp. \quad (4)$$

The volume between levels 40 and the time are the only accurate basic information used by the present invention to calculate accurate inflow and outflow. When the pump is not in operation, an accurate $\overline{\text{Inflow}}$ is calculated.

FIG. 3 to FIG. 8 shows why an equation calculating a curve represents more accurately the reality continually changing rate of an inflow. FIG. 3 to FIG. 5 and FIG. 6 to FIG. 8 represent 2 examples of continually changing rate of an inflow over a period of 4 cycles.

Figure 3:
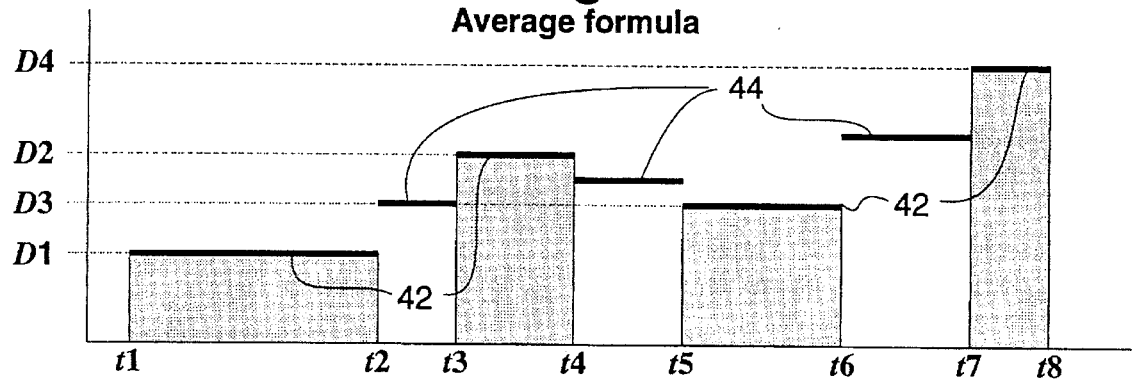
FIG. 3 is a graph of 4 pump cycles showing inflow calculated using the average method.

FIG. 3 is a graph showing inflow calculated using an average method. It represents 4 cycles of a pump station in which the inflow rate had changed over time. An accurate $\overline{\text{Inflow}}$ 42 is calculated for each period t1–t2, t3–t4, t5–t6 and t7–t8 in which the pump are not in operation. D1=$\overline{\text{Inflow}}$ of period t1–t2, D2=$\overline{\text{Inflow}}$ of period t3–t4, D3=$\overline{\text{Inflow}}$ of period t5–t6, and D=$\overline{\text{Inflow}}$ of period t7–t8. Knowing the accurate volume between levels 40 and the accurate time at which the levels are reached, the $\overline{\text{Inflow}}$ is therefore accurate.

A method of calculating inflow while the pump is running is to extrapolate the last calculated inflow in the pump running period t2–t3, t4–t5 and t6–t7. Extrapolating assumes a non changing rate of inflow over time which is a highly unfair representation of reality, so it was not included with the drawings. FIG. 3 shows a more accurate, but not perfect method of calculating inflow while the pump is running. It calculates an average 44 of the inflow ($\overline{\text{Inflow}}$) for the period before and after the pump operation period which is $$\overline{\overline{\text{Inflow}}} = \frac{\frac{\text{volume}}{t2 - t1} + \frac{\text{volume}}{t4 - t3}}{2},$$

and so on for the other cycles. Averaging assumes a fixed changing rate of inflow over time which is not a fair representation of reality either. It appears accurate that the inflow at one time is somewhere between the inflow before and after that time, but if the time was a peak and inflow before and after were calculated on each side of it, then assuming the average of the inflow before and after represents the flow at this time is wrong.

Figure 4:
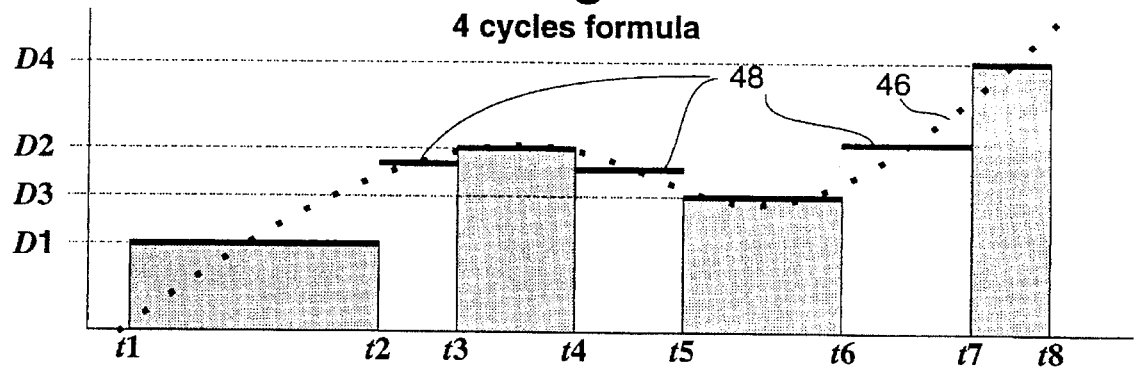
FIG. 4 is a graph of 4 pump cycles showing inflow calculated using a function of the inflow and time f(t)

FIG. 4 is a graph of 4 pump cycles showing an inflow calculated using a function which generates a curve of the inflow and time f(t). It represents the same cycles as FIG. 3 using a function Inflow(t) of the inflow in relation to time that uses the trend on the inflow over 4 cycles, which is over 4 $\overline{\text{Inflow}}$ calculations. The curve 46 represents Inflow(t) created using the $\overline{\text{Inflow}}$ of the period D1, D2, D3 and D4. Averages 48 are extracted from Inflow(t).

Figure 5:
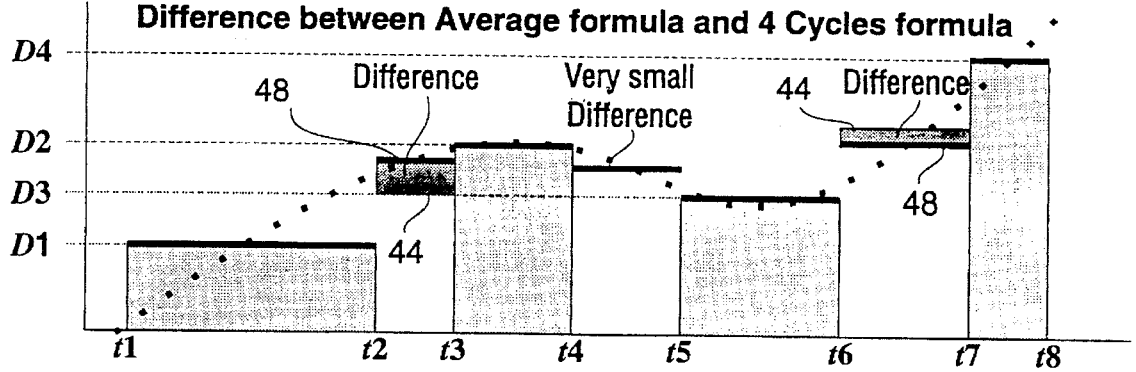
FIG. 5 is a graph of 4 pump cycles comparing the results of the average method and the function f(t)

FIG. 5 is a graph of 4 pump cycles comparing the results of the average method, explained in FIG. 3, and the function Inflow(t), explained in FIG. 4. It compares the averages 44 calculated with the average method and the averages 48 calculated with Inflow(t). The difference, between the averages 44 and 48 for each period of pump running, is related to the variation of the inflow during these period.

Figure 6:
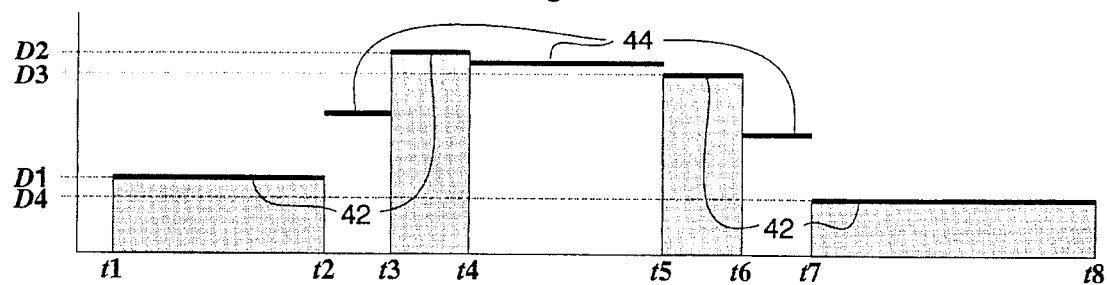
FIG. 6 is a graph of 4 pump cycles showing inflow calculated using the average method in which a peak inflow is reached.

FIG. 6 is a graph of 4 pump cycles showing inflow calculated using the average method in which a peak inflow is reached.

Figure 7:
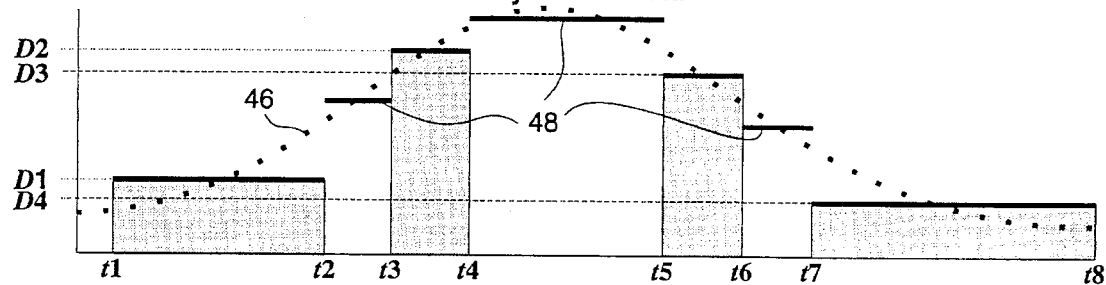
FIG. 7 is a graph of 4 pump cycles showing inflow calculated using the function f(t) in which a peak inflow is reached.

FIG. 7 is a graph of 4 pump cycles showing an inflow calculated using a function which generates a curve of the inflow and time f(t). It represents the same cycles as FIG. 6 using a function Inflow(t) of the inflow in relation to time that uses the trend on the inflow over 4 cycles, which is over 4 $\overline{\text{Inflow}}$ calculations.

The curve 46 represents Inflow(t) created using the $\overline{\text{Inflow}}$ of the period D1, D2, D3 and D4. Averages 48 are extracted from Inflow(t).

Figure 8:
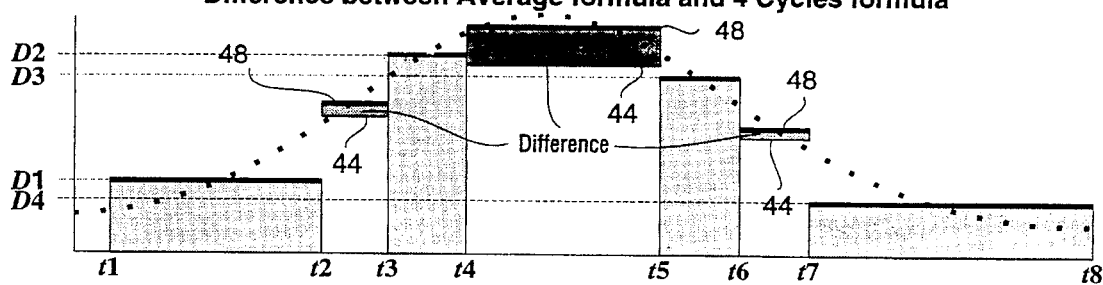
FIG. 8 is a graph of 4 pump cycles comparing the results of the average method and the function f(t) in which a peak inflow is reached.

FIG. 8 is a graph of 4 pump cycles comparing the results of the average method and the function Inflow(t) in which a peak inflow is reached. It compares the averages 44 calculated with the average method and the averages 48 calculated from Inflow(t) for the same cycles as FIG. 6 and FIG. 7. The difference between the averages 44 and 48 for each period of pump operation, becomes large when a peak is present. To increase the accuracy of the curve, only the middle on the curve, between t4 and t5, is used. Every time a new $\overline{\text{Inflow}}$ can be calculated, a new Inflow(t) is calculated and only the middle portion is used because it is the most accurate portion of Inflow(t).

The result of the following equation 5 is Inflow(t).

$$\text{Inflow}(t) = at^3 + bt^2 + ct + d$$

The function Inflow(t) is a curve with two possible changes of direction. This formula gives a function in which the average of each interval is equal to the $\overline{\text{Inflow}}$ used to calculate it.

This means:

$$\int_{t1}^{t2} f(t)dt = D1,$$

$$\int_{t3}^{t4} f(t)dt = D2,$$

$$\int_{t5}^{t6} f(t)dt = D3 \text{ and}$$

-continued $$\int_{t7}^{t8} f(t)dt = D4.$$

Inflow(t) is extracted by following these steps:

$$\int_{t1}^{t2} f(t)dt =$$

$$\int_{t1}^{t2} at^3 + bt^2 + ct + d = a\int_{t1}^{t2} t^3 dt + b\int_{t1}^{t2} t^2 dt +$$

$$c\int_{t1}^{t2} t dt + d\int_{t1}^{t2} dt = a\left[\frac{t^4}{4} + K_1\right]_{t1}^{t2} + b\left[\frac{t^3}{3} + K_2\right]_{t1}^{t2} +$$

$$c\left[\frac{t^2}{2} + K_3\right]_{t1}^{t2} + d[t + K_4]_{t1}^{t2} =$$

$$a\left[\left(\frac{t2^4}{4} + K_1\right) + \left(\frac{t1^4}{4} + K_1\right)\right] +$$

$$b\left[\left(\frac{t2^3}{3} + K_1\right) + \left(\frac{t1^3}{3} + K_1\right)\right] +$$

$$c\left[\left(\frac{t2^2}{2} + K_1\right) + \left(\frac{t1^2}{2} + K_1\right)\right] + d((t2 + K_1) +$$

$$(t1 + K_1)] = a\left(\frac{t2^4 - t1^4}{4}\right) + b\left(\frac{t2^3 - t1^3}{3}\right) +$$

$$c\left(\frac{t2^2 - t1^2}{2}\right) + d(t2 + t1) = D1$$

It is the same for the 3 other intervals:

$$= a\left(\frac{t4^4 - t3^4}{4}\right) + b\left(\frac{t4^3 - t3^3}{3}\right) + c\left(\frac{t4^2 - t3^2}{2}\right) +$$

$$d(t4 + t3) = D2$$

$$= a\left(\frac{t6^4 - t5^4}{4}\right) + b\left(\frac{t6^3 - t5^3}{3}\right) + c\left(\frac{t6^2 - t5^2}{2}\right) +$$

$$d(t6 + t5) = D3$$

$$= a\left(\frac{t8^4 - t7^4}{4}\right) + b\left(\frac{t8^3 - t7^3}{3}\right) + c\left(\frac{t8^2 - t7^2}{2}\right) +$$

$$d(t8 + t7) = D4$$

It gives 4 equations with 4 unknowns that can be resolved to find the values of a, b, c and d of the function Inflow(t)= $at^3+bt^2+ct+d$.

If a flow calculator is not powerful enough to use this sophisticated function, the following less accurate, but still usable functions can be used where $$\text{Inflow}(t) = \frac{D2 + D3}{2}.$$

An $\overline{\text{Outflow}}$ represents the average of a plurality of Outflows.

The liquid level in the wet well directly affects the performance, or outflow, of the pump. The higher the level, the better the performance. The lower the level, the lower the performance. If the liquid level stays higher for more than half the pumping time, then it is expected to calculate an Outflow higher than the $\overline{\text{Outflow}}$. If the liquid level stays lower for more than half the pumping time, then it is expected to calculate an Outflow lower than the $\overline{\text{Outflow}}$. Outflow is accurate only if the period in which the liquid level is high is as long as the period in which the liquid level is low in the pumping time. Inflow(t) is also used to figure out the liquid level while the pump is running.

Figure 9:
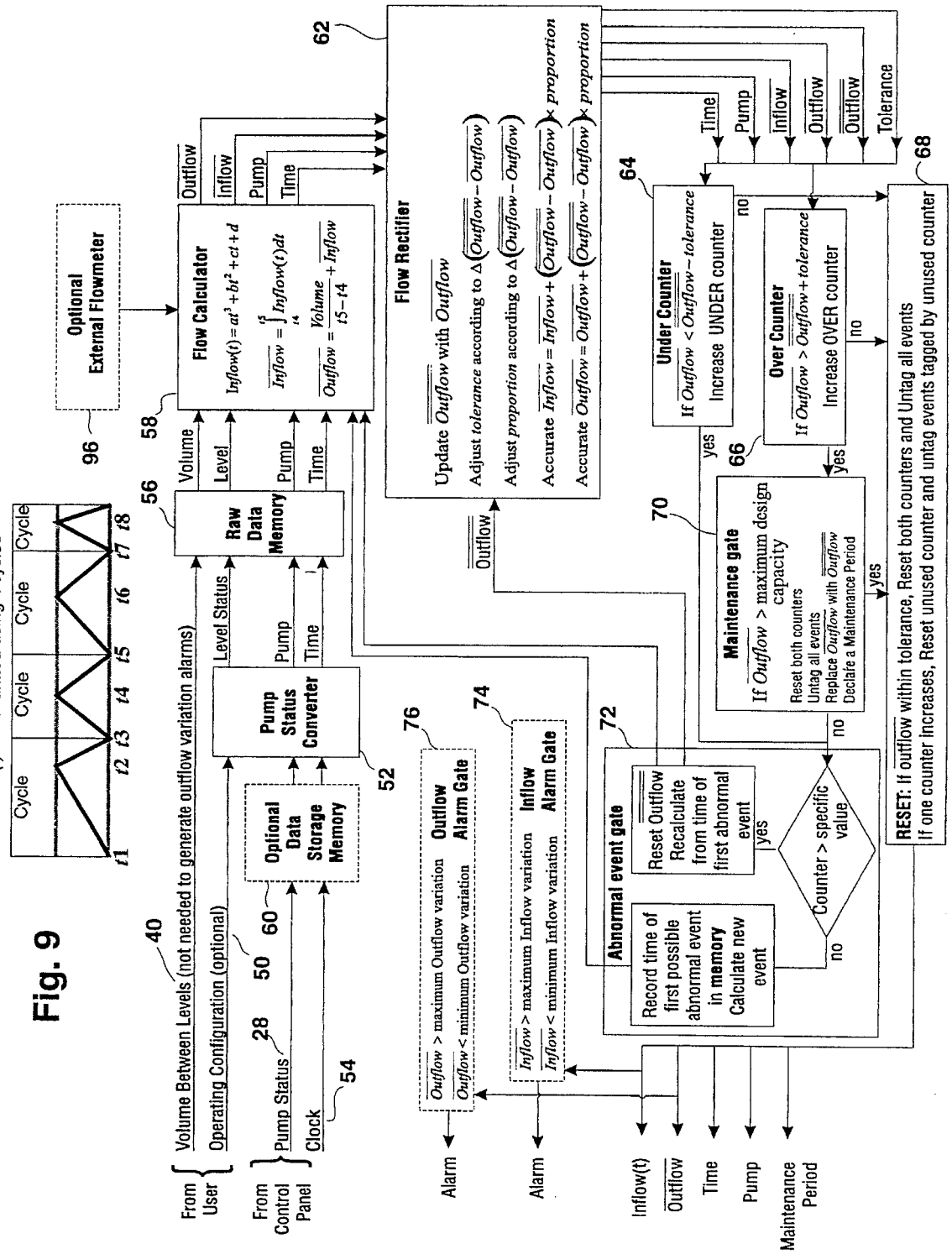
FIG. 9 is a block diagram of a basic embodiment of the present invention using a pump status converter, a flow rectifier, an abnormal pump operation processor, and a flow variation alarm gate.

FIG. 9 is a block diagram of a basic embodiment of the present invention using a pump status converter, a flow rectifier, a maintenance gate, an abnormal event gate, and flow variation alarm gates. The block diagram of FIG. 9 discloses a system, according to the present invention, for obtaining accurate outflow and inflow by using solely the pump 28 status from the basic apparatus described in FIG. 1 operating according to FIG. 2, and time. The user supplies the volume between levels 40 and the operating configuration 50 to a pump status convertor 52, if the pump station operates differently than the one described in FIG. 2. If the user does not supply the volume 40, the present invention can still generate alarms based on variation of the pump outflow.

A clock 54 generates the time at which the pump status 28 is changing. The pump status is also used to identify the pump for which an outflow is calculated and its associated time. The time and the pump status can optionally be recorded in a data storage memory 60 for later processing. The pump status and its related time of occurrence is transmitted to a pump status converter 52. The pump status converter 52 generates the start levels status and stop levels status from the pump status 28 and the operating configuration 50. This information is recorded in a raw data memory 56. A flow calculator 58 calculates Inflow(t), and $\overline{\text{Outflow}}$ of the pump in operation between the time t4 and t5 as described in FIG. 2. Equation 6 extracts from Inflow(t) the $\overline{\text{Inflow}}$ for the period t4 to t5. $\overline{\text{Outflow}}$ is calculated using equation 7.

$$\overline{\text{Inflow}} = \int_{t4}^{t5} \text{Inflow}(t)dt \tag{6}$$

$$\overline{\text{Outflow}} = \frac{\text{Volume}}{t5 - t4} + \overline{\text{Inflow}} \tag{7}$$

To achieve the maximum accuracy for each individual pump station installation, the following hypotheses are assumed:

a) An outflow for a pump varies slowly over time, unless an abnormal condition occurs;

b) An inflow varies rapidly; therefore the difference between reality and the calculated inflow can be high;

c) An average of $\overline{\text{Outflow}}$ calculated over many cycles, $\overline{\overline{\text{Outflow}}}$, is usually accurate, unless an abnormal condition occurs;

d) The real outflow for a pump is somewhere between $\overline{\text{Outflow}}$ and $\overline{\overline{\text{Outflow}}}$, unless an abnormal condition occurs.

e) An $\overline{\text{Outflow}}$ is influenced by the average liquid level for the period at which $\overline{\text{Outflow}}$ is calculated.

A flow rectifier 62 is used to cross check the accuracy of the $\overline{\text{Outflow}}$ and $\overline{\text{Inflow}}$ according to the preceding hypotheses in which an average of $\overline{\text{Outflow}}$ is calculated using many $\overline{\text{Outflow}}$, an acceptable difference between $\overline{\text{Outflow}}$ and $\overline{\overline{\text{Outflow}}}$ is considered, adjusted and applied, and an adjustment is made to $\overline{\overline{\text{Outflow}}}$ to reflect the average liquid level for the period at which $\overline{\text{Outflow}}$ is calculated.

A variable tolerance refers to an acceptable percentage of difference between the $\overline{\text{Outflow}}$ and the $\overline{\overline{\text{Outflow}}}$. The variable tolerance is increased if $\overline{\text{Outflow}}$ is too close to the limit of $\overline{\overline{\text{Outflow}}}$ ±the variable tolerance or if it exceeds it. The variable tolerance is reduced if $\overline{\text{Outflow}}$ is closer to $\overline{\overline{\text{Outflow}}}$ than the limit of $\overline{\overline{\text{Outflow}}}$ ±the variable tolerance. The $\overline{\text{Outflow}}$ is used to update $\overline{\overline{\text{Outflow}}}$. A proportion of accuracy factor is used to specify where the real outflow is between $\overline{\text{Outflow}}$ and $\overline{\overline{\text{Outflow}}}$. The function $\underline{\text{Inflow}}(t)$ is used to calculate at which average liquid level $\overline{\overline{\text{Outflow}}}$ was calculated and affect the proportion of accuracy factor accordingly. If the $\overline{\text{Outflow}}$ calculated is within the range of $\overline{\overline{\text{Outflow}}} \pm$ the variable tolerance, then the proportion of accuracy factor will be different than if $\overline{\text{Outflow}}$ was outside the variable tolerance. The proportion of accuracy is always applied to readjust the values of $\overline{\text{Inflow}}$ and $\overline{\text{Outflow}}$ according to the following equations 8 and 9:

$$\text{Accurate } \overline{\text{Inflow}} = \overline{\text{Inflow}} + (\overline{\overline{\text{Outflow}}} - \overline{\text{Outflow}}) \times \text{proportion} \quad (8)$$

$$\text{Accurate } \overline{\text{Outflow}} = \overline{\text{Outflow}} + (\overline{\overline{\text{Outflow}}} - \overline{\text{Outflow}}) \times \text{proportion} \quad (9)$$

The flow rectifier 62 gives accurate results if the station is operating normally, but can not discern errors in calculation from abnormal pump operation. A combination of counters and gates determine if the results, calculated when the pump is in operation, are right or wrong. An event is composed of the pump status, the start and stop time of the pump, the $\overline{\text{Inflow}}$, the $\overline{\text{Outflow}}$ and the $\overline{\overline{\text{Outflow}}}$ for the period included between the start and stop time. Variation determining means illustrated as under and over counters 64, 66 is provided responsive to the flow rectifier 62 for determining the occurrence of a variation between the average emptying characteristic and a predetermined tolerance, and tagging the level status signal, the timing signal, and the volume signal used to calculate the emptying characteristic as being a possible abnormal event.

An under counter 64 is increasing each time $\overline{\text{Outflow}}$ is lower than $\overline{\overline{\text{Outflow}}}$ minus the variable tolerance. When this occurs, the under counter 64 tags the events used to calculate $\overline{\text{Outflow}}$ as being possibly abnormal events.

An over counter 66 is increasing each time $\overline{\text{Outflow}}$ is higher than $\overline{\overline{\text{Outflow}}}$ added to the variable tolerance. When this occurs, the over counter 66 tags the events used to calculate $\overline{\text{Outflow}}$ as being possibly abnormal events.

A reset means 68 resets the under counter 64 when the over counter 66 increases, and resets the over counter 66 when the under counter 64 increases. It untags the possible abnormal events tagged by the under counter 64 when the over counter 66 increases, and untags the possible abnormal events tagged by the over counter 66 when the under counter 64 increases. It resets both counters and untags all possible abnormal events tagged by both counters when the $\overline{\text{Outflow}}$ is within $\overline{\overline{\text{Outflow}}} \pm$ the variable tolerance.

A maintenance gate 70 operates when $\overline{\text{Outflow}}$ is higher than a predetermined maximum outflow representing an outflow that could not be achieved under the best conditions. When the $\overline{\text{Outflow}}$ is higher than the predetermined maximum outflow, it resets both counters (64 and 66) and untags the possible abnormal events tagged by both counters (64 and 66). It calculates the time of operation of the maintenance gate 70 and the cumulative time of operation of the pump during the operation of the maintenance gate 70. It calculates the total flow through wet well using the $\overline{\text{Outflow}}$ multiplied by the time of operation of pump. It calculates the average inflow for the time in which the maintenance gate 70 is in operation by dividing the total flow through wet well by the time of operation of the maintenance gate 70. Then it generates a maintenance status signal.

An abnormal event gate 72 is used when one of the counters (64 or 66) increases. It operates when one of the counters (64 or 66) is higher than a predetermined value representing the number of possible abnormal events necessary to become confirmed abnormal events. It recalculates the $\overline{\text{Outflow}}$ from the time of the first tagged possible abnormal event then reprocesses the information recorded in the raw data memory 56 from the time of the first tagged possible abnormal event using the newly calculated $\overline{\text{Outflow}}$ when necessary. When the abnormal event gate 72 is not in operation, it records the time of the first tagged possible abnormal event in its memory, then tells the flow calculator 58 to read a new event from the raw data memory 56.

The data can be used to calculate other valuable information like volume through the wet well, pump's outflow and combination of pump's outflow. Most pump stations are designed to accept a certain inflow, and a specific outflow is expected for each pump and combination of pumps. An inflow alarm gate 7,4 can be set to generate an alarm when the $\overline{\text{Inflow}}$ is outside a preset maximum and minimum inflow or a maximum flow variation. An outflow alarm gate 7,6 can be set to generate an alarm when the $\overline{\text{Outflow}}$ is outside a preset maximum and minimum outflow or a maximum variation flow for each possible combination of pumps.

It is sometimes difficult or impossible for a user to know the volume between levels in the wet well, but the user might want to know if the pump is performing as expected. Most pump stations are designed to have the same pump operating between the same level. This means a pump always operates within a constant volume. The volume is the most important ingredient to calculate flow. If it can not be supplied, the inflow or outflow can not be calculated, but it is still possible to generate alarms based on a variation of their outflow. In this case, the present invention supplies a constant to replace the volume which means the inflow and outflow can not be called as such, but the outflow alarm gate 76 and inflow alarm gate 74 still can be used to generate alarms based on flow variation.

This method could use level status received from the pump station level sensors (26 and 32) when the pump status converter is not used.

The inflow or outflow calculation could come from an external flowmeter 96. This is useful when such external flowmeter 96 is known to be more accurate, already installed, or when the volume between level can not be determined with accuracy. In these conditions, the $\overline{\text{Inflow}}$ could be calculated if the external flowmeter 96 supplys the $\overline{\text{Outflow}}$, or the $\overline{\text{Outflow}}$ could be calculated if the external flowmeter 96 supplys the $\overline{\text{Inflow}}$. It could also be used to readjust the $\overline{\text{Outflow}}$ of a pump based on the difference between the $\overline{\text{Outflow}}$ calculated with the external flowmeter 96 and the $\overline{\text{Outflow}}$ calculated using the present invention, then applying this difference to the other pumps calculated solely with the present invention.

Figure 11:
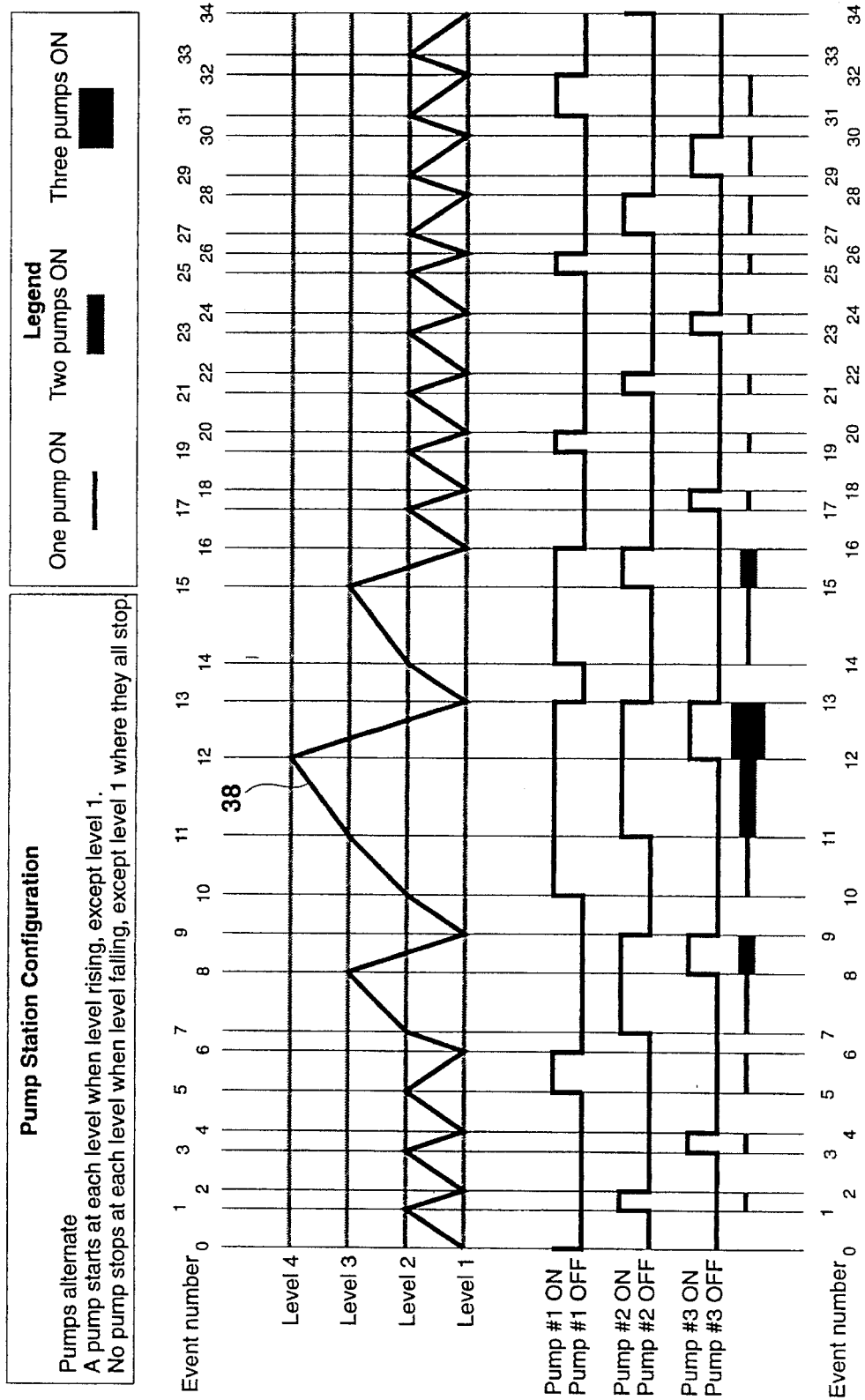
FIG. 11 is a schematic of pump operation and level activation in reference to time for a pump station having 3 pumps.

FIG. 11 is a block diagram of a pump status conveyer. It describes in detail how the pump status conveyer 52 generates level status from pump status for a pump station having 3 pumps. This model can be used for any number of pumps. Level sensors like float switches, ultrasonic or pressure sensors, just to name a few, are installed to start and stop the pumps in a preset and known sequence when preset levels are reached. Then, if the preset sequence and the pump status is known, it is possible to know the level at which a pump status is changing without being connected to any sensor. The level status generated represents which level is reached and the time at which it is reached. These pieces of information are the basic elements used by volumetric flowmeters. They are known to be accurate if the pump station is not in a maintenance period.

Pump station control panels are built to start and stop the pumps in a predetermined sequence when the liquid level rises and falls. The operational sequence can be affected by two external factors: the level reached and an optional time delay that suspends momentarily the beginning or the end of an event, which can be a pump start or stop.

The pump status comparator 52 converts pump status signals into level status to determine the level of the liquid in the wet well system and the time at which the level is reached. An operation sequence memory 80 is used for storing an association sequence 82 (expected pump status—level reached) representing, for each level, the pump status expected to be received when the level is reached. A comparator 84 compares the pump status signal to the expected pump status in the association sequence 82, which returns an associated level reached. A level memory 86 records the level reached and time of occurrence. A level gate operates when the level reached is different than the last level in level memory 86 to replace it with the last level reached which indicates the level of the liquid in the wet well when the pump status changed.

Two things can happen to the liquid level in a pump station: it can rise or fall. For each level, two types of pump status can happen: pumps can start or stop. In the operation sequence memory 80, the lowest level, the one under which no other events occur, is level 1. The highest, the one over which no other events occur, have the highest number. When the liquid level is rising from level 1 and up, a specific pump status that represents the operation of the pumps is selected for each level. When the liquid level is falling, a specific pump action that represents the operation of the pumps when the level is falling is selected for each level. Pump action, like Pump #1 starts or Pump #1 stops, can only be chosen once for all the levels because of their specificities. When a pump action is not related to a specific pump, like a pump starts or stops, it means it can apply to any of the pumps. This is mostly used for pump stations with alternating pumps.

A list of predetermined possible pump status 94 can be used to help the selection.

A predetermined association sequence 82 can be recorded in the operation sequence memory 80 to eliminate the intervention of the user.

A self adjusting operating sequence 92 could read the sequence of the pump status recorded in the data storage memory 60, analyze it, then record the right sequence in the operation sequence memory 80.

Figure 10:
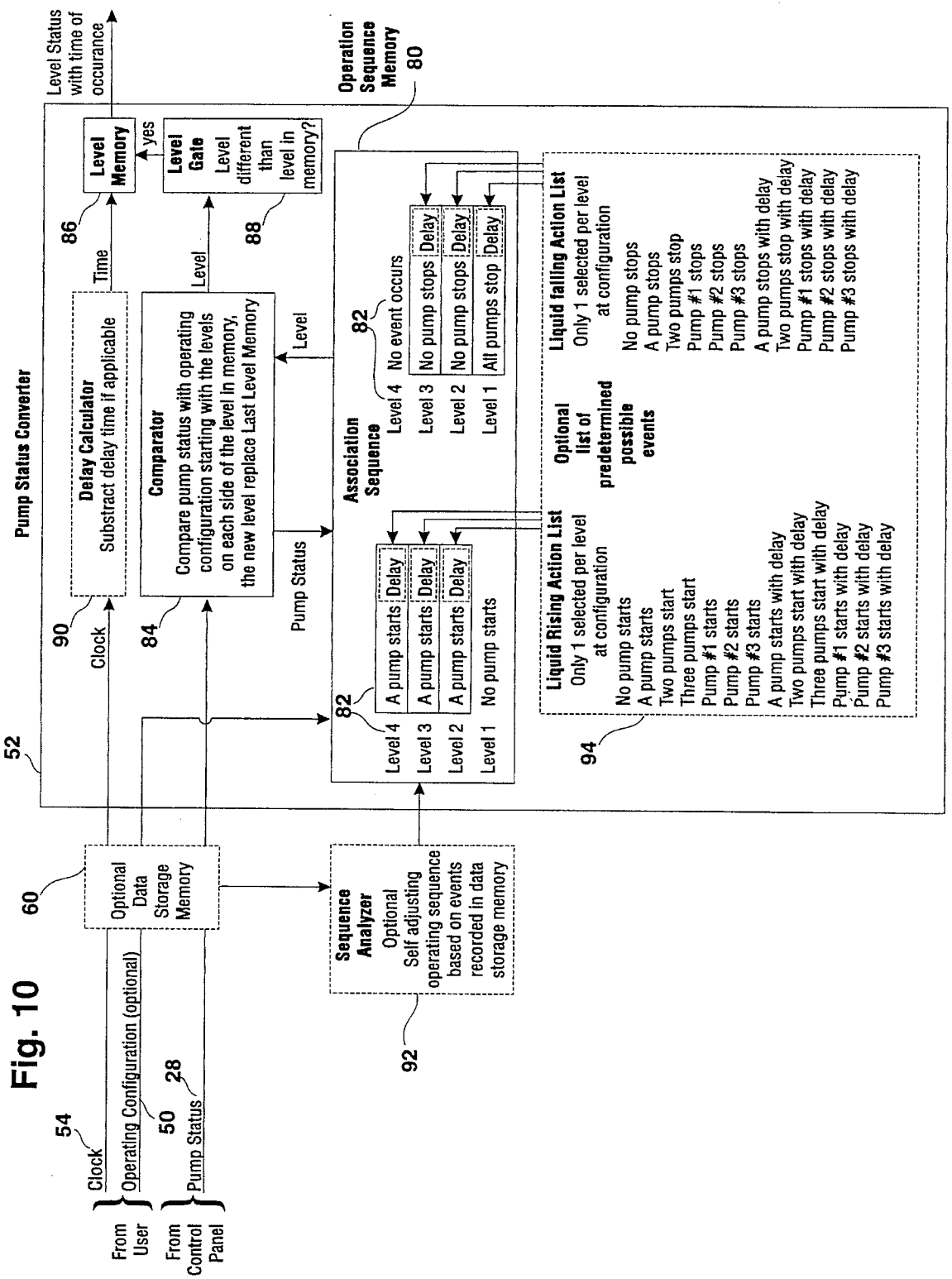
FIG. 10 is a block diagram of a pump status converter.

FIG. 11 is a schematic of pump operation and level activation with reference to time for a pump station having 3 pumps operating according to the association sequence 82 configured in the pump status converter 52 of FIG. 10. In most pump stations, pumps alternate to wear them equally. Usually, the inflow is lower than the outflow of a pump, but not all the time. The outflow of a pump is higher than the inflow when only one pump starts, then stops. If the inflow is higher than the outflow of the pump in operation, the liquid level continues to rise until a higher level is reached which starts a second pump. The pumps will stop at level 1 if the outflow of the pumps combined is higher than the inflow. If the inflow is still higher than the outflow of the two pumps in operation, the liquid level continues to rise until a higher level is reached which starts a third pump. Pump stations are designed to have a higher outflow than inflow.

Events number 1 to 6 show pumps having individually a higher outflow than the inflow, and they alternate. Event 7 to 8 shows an inflow higher than the outflow of the pump, this is why the liquid level 38 is rising. A second pump starts at event 8 and the outflow of the combination of pumps is higher than the inflow so the level falls between events 8 and 9 until level 1 is reached again. Event 10 to 11 shows an inflow higher than the outflow of the pump, this is why the liquid level 38 is rising. A second pump starts at event 11, but the outflow of the combination of pumps is still lower than the inflow, so the level continues to rise until a third pump starts at event 12 when level 4 is reached. The outflow of the combination of pumps is higher than the inflow so the level falls between events 12 and 13 to reach level 1 again. Events 14 to 16 are the same as 7 to 9. Events 17 to 34 are the same as 1 to 6.

By associating the pump status of FIG. 11 with the settings of the association sequence selection 82, we can see that the first pump starts at event 1, level 2 was reached and recorded with its time of occurrence. The next pump status is a pump stop at event 2, which translates to a level 1 in the association sequence selection 82. So a level 1 is recorded with its time of occurrence. The same occurs until event 8 when a second pump starts. This translate to level 3 in the association sequence selection 82. When all pumps stop at event 9, the association sequence selection 82 associates this pump sequence with level 1. All the other events use the same procedure.

SUMMARY, RAMIFICATIONS, AND SCOPE

Accordingly, the reader will see that the pump station flowmeter of this invention can be installed without being connected to any level sensors, therefore reducing the cost of installation. Furthermore, the pump station flowmeter has the advantages of:

reducing the inflow and outflow errors without the use of additional or existing level sensors;

accurately calculating flows, even when inflow changes rapidly without the use of additional or existing level sensors;

discerning outflow calculation errors from abnormal pump operation;

continuously self adjusting the equation parameters to optimize the accuracy for each individual station;

identifying when a pump station is in maintenance period;

calculating inflow using a function representing the time changing reality;

generating abnormal pump flow alarms, even without supplying the wet well geometry or being connected to the level sensors;

calculating inflow and outflow when a pump is continuously running and when more than one pump is running.

The pump status converter 52, which is part of this invention can be used to supply to other instruments the level data they need without being connected to any level sensor. This device can be used in any installation that has a mechanism that changes its state at set levels. This device facilitates the installation of instruments that need to know the level to operate. Volumetric flowmeters are good examples of these instruments. This apparatus reduces installation time of such instrument from hours to minutes by reducing or eliminating the necessary modification of the control panel of the pump station.

Although the description above contains many specificities, these should not be construed as limiting the scope of the invention but as merely providing illustrations of some of the presently preferred embodiments of this invention. For example, the flowmeter could be used to calculate the flow of a solid (like powder) filling a silo at a rate, and a mechanical device emptying it at a constant rate when set levels are reached. Another example, the invention could be integrated to a pump to generate flow variation alarms when the pump is having problems.

Thus, the scope of the invention should be determined by the appended claims and their legal equivalents, rather than by the examples given.

What is claimed is:

1. Apparatus for determining the liquid flow characteristics of a wet well system including a wet well, at least one pump connected to the wet well for pumping fluid from the wet well, a source of pump status signals responsive to the at least one pump, and a timing signal generator for generating a timing signal, the apparatus comprising:

(a) pump status converter means responsive to the pump status signals and the timing signal for converting the pump status signals into a level status signal;
   (b) flow calculating means responsive to the level status signal, the timing signal, and a predetermined volume signal representative of a volume of fluid between predetermined levels of the wet well for calculating a plurality of filling and emptying characteristics of the wet well;
   (c) flow rectifying means responsive to said flow calculating means for calculating an average emptying characteristic of a plurality of emptying characteristics and for rectifying the plurality of filling and emptying characteristics responsive to at least the average emptying characteristic and a predetermined tolerance;
   (d) variation determining means responsive to said flow rectifying means for determining the occurrence of a variation between the average emptying characteristic and the predetermined tolerance, and tagging the level status signal, the timing signal, and the predetermined volume signal used to calculate the emptying characteristic as being a possible abnormal event;
   (e) maintenance gate means responsive to said variation determining means for operating when a calculated emptying characteristic is higher than a predetermined maximum emptying characteristic, for calculating a time of operation of said maintenance gate means and the at least one pump, for calculating total flow through the wet well using the average emptying characteristic multiplied by the time of operation of the at least one pump, and for calculating average filling characteristic by dividing the total flow through wet well by the time of operation of said maintenance gate means to thereby generate a maintenance status signal;
   (f) resetting means responsive to said variation determining means and said maintenance gate means for resetting said variation determining means and untagging the possible abnormal event tagged by said variation determining means if no variation between the average emptying characteristic and the predetermined tolerance occurs and responsive to said maintenance status signal; and
   (g) abnormal event gate means responsive to said variation determining means and said maintenance gate means for operating when a value of said variation determining means is higher than a predetermined value representing the number of said possible abnormal events necessary to become confirmed abnormal events and for recalculating the average emptying characteristic from the time of first tagging the possible abnormal event.

2. Apparatus as defined in claim 1, and further including data storing means for storing the pump status and the time at which the pump status changed.

3. Apparatus as defined in claim 1, wherein said flow calculating means (58) uses equation Inflow(t)=$at^3+bt^2+ct+d$.

4. Apparatus as defined in claim 1, wherein said flow calculating means (58) uses equation $$\text{Inflow}(t) = \frac{D2 + D3}{2}.$$

5. Apparatus to convert pump status signals responsive to a pump of a wet well system into level status for determining the level of a liquid and the time at which the level is reached in the wet well system, the apparatus comprising:

(a) operation sequence memory means for storing an association sequence representing each level of a wet well and an expected pump status to be received when each level is reached;
   (b) comparator means responsive to said operation sequence memory means for comparing an actual pump status signal to an expected pump status in the association sequence to determine an associated level reached;
   (c) level memory means responsive to said comparator means for storing the level reached and a time that the level was reached; and
   (d) level gate means responsive to said level memory means operating when the level reached is different than a last level in level memory means to replace the last level in said level memory means with the level reached which indicates the level of the liquid in the wet well when the pump status changed.

6. Apparatus as defined in claim 1, wherein said flow rectifying means also uses a predetermined proportion.

7. Apparatus as defined in claim 1, further including an inflow alarm gate means responsive to said resetting means for operating when said filling characteristics are outside a maximum variation representing an alarming filling characteristic.

8. Apparatus as defined in claim 1, further including an outflow alarm gate means responsive to said resetting means for operating when said emptying characteristics are outside a maximum variation representing an alarming emptying characteristic.

9. Apparatus as defined in claim 8, wherein said filling and emptying characteristics are replaced by filling and emptying coefficients for generating alarms.

10. Apparatus as defined in claim 5, wherein the association sequence is predetermined to eliminate the intervention of a user of the apparatus.

11. Apparatus as defined in claim 1, wherein said flow calculating means comprises a first flow calculating means, and wherein the filling characteristic of said first flow calculating means is compared with filling characteristic calculated by a second flow calculating means to readjust the filling and emptying characteristics calculated by said first flow calculating means.

12. Apparatus as defined in claim 1, wherein said flow calculating means comprises a first flow calculating means, and wherein the emptying characteristic of said first flow calculating means is compared with emptying characteristic calculated by a second flow calculating means to readjust the filling and emptying characteristics calculated by said first flow calculating means.

13. Apparatus as defined in claim 5, wherein the association sequence is selected from a list of predetermined possible events.

14. Apparatus as defined in claim 5, further comprising delay calculating means responsive to said comparator means for adding a time difference between a pump status change and the reaching of a level to the time of occurrence before it is recorded in said level memory means.

15. Apparatus as defined in claim 5, and further including data storing means for storing the pump status and the time at which the pump status changed.

16. Apparatus as defined in claim 15, wherein the association sequence is self adjusted by a sequence analyzer which reads a sequence of events recorded in said data storing means.

* * * * *

UNITED STATES PATENT AND TRADEMARK OFFICE
CERTIFICATE OF CORRECTION

PATENT NO. : 5,597,960
DATED      : January 28, 1997
INVENTOR(S) : Benoit Beaudoin It is certified that error appears in the above-indentified patent and that said Letters Patent is hereby corrected as shown below:

On the title page, item [76] Inventors name should read -- Benoit Beaudoin--

Signed and Sealed this

Twenty-seventh Day of May, 1997

Attest:

BRUCE LEHMAN

Attesting Officer

Commissioner of Patents and Trademarks